(12) United States Patent
Kim et al.

(10) Patent No.: US 11,803,499 B2
(45) Date of Patent: *Oct. 31, 2023

(54) METHOD OF OPERATING AUDIO SUBSYSTEM FOR USB MODULE, SYSTEM-ON-CHIP PERFORMING THE SAME AND METHOD OF OPERATING SYSTEM-ON-CHIP USING THE SAME

(71) Applicant: SAMSUNG ELECTRONICS CO., LTD., Suwon-si (KR)

(72) Inventors: Younghyeok Kim, Seoul (KR); Hana Yang, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,808

(22) Filed: Aug. 8, 2022

(65) Prior Publication Data

US 2022/0374375 A1     Nov. 24, 2022

Related U.S. Application Data

(63) Continuation of application No. 17/038,297, filed on Sep. 30, 2020, now Pat. No. 11,409,680.

(30) Foreign Application Priority Data

Mar. 30, 2020     (KR) ......................... 10-2020-0038065

(51) Int. Cl.
*G06F 13/38*     (2006.01)
*G06F 1/10*     (2006.01)
(Continued)

(52) U.S. Cl.
CPC .............. *G06F 13/385* (2013.01); *G06F 1/10* (2013.01); *G06F 3/16* (2013.01); *G06F 3/162* (2013.01); *G06F 3/165* (2013.01); *G06F 13/28* (2013.01)

(58) Field of Classification Search
CPC .............. G06F 13/385; G06F 1/10; G06F 3/16
See application file for complete search history.

(56) References Cited

U.S. PATENT DOCUMENTS 5,761,537 A * 6/1998 Sturges ..................... H04S 3/00
                                                    710/72
7,962,668 B2 * 6/2011 Ding ......................... G06F 3/16
                                                    710/33
(Continued)

FOREIGN PATENT DOCUMENTS

JP     2009-289306 A     12/2009
JP     4507672 B2     7/2010
(Continued)

*Primary Examiner* — David E Martinez
(74) *Attorney, Agent, or Firm* — Sughrue Mion, PLLC

(57) ABSTRACT

In a method of operating an audio subsystem and a universal serial bus (USB) module, the audio subsystem receives a reference clock signal from the USB module. A USB direct memory access (UDMA) block included in the audio subsystem performs an automatic restart every predetermined period in synchronization with the reference clock signal. The UDMA block transmits data having a predetermined size to the USB module by performing a direct memory access (DMA) operation whenever the automatic restart is performed.

7 Claims, 15 Drawing Sheets

(51) Int. Cl.
  *G06F 3/16* (2006.01)
  *G06F 13/28* (2006.01)

(56) References Cited

U.S. PATENT DOCUMENTS 8,943,351 B2    1/2015  Foster
2005/0209852 A1* 9/2005  Beckert .............. B60R 16/0315
                                               704/246

FOREIGN PATENT DOCUMENTS

JP    2013-114670 A    6/2013
JP       3351385 A   11/2022

* cited by examiner

\# METHOD OF OPERATING AUDIO SUBSYSTEM FOR USB MODULE, SYSTEM-ON-CHIP PERFORMING THE SAME AND METHOD OF OPERATING SYSTEM-ON-CHIP USING THE SAME

CROSS-REFERENCE TO THE RELATED APPLICATION

This is a Continuation of U.S. application Ser. No. 17/038, 297 filed Sep. 30, 2020, which claims priority to Korean Patent Application No. 10-2020-0038065, filed on Mar. 30, 2020 in the Korean Intellectual Property Office, the disclosure of which is incorporated herein in its entirety by reference.

BACKGROUND

1. Field

Example embodiments relate to semiconductor integrated circuits, and more particularly to methods of operating audio subsystems for universal serial bus (USB) modules, system-on-chips (SOCs) performing the methods of operating the audio subsystems, and method of operating SOCs using the methods of operating the audio sub systems.

2. Description of the Related Art

The use of portable electronic devices is now ubiquitous, and service providers and device manufacturers are competing to develop new and unique products and services. Portable electronic devices with multimedia player functions, such as a moving picture player function and an audio player function, have been widely used.

Recent portable electronic devices dispense with sockets such as 3.5 Pi sockets for audio communication, and instead, use universal serial bus (USB) earphones, headsets, and the like. Accordingly, various technologies have been researched to improve the performance of the USB earphones.

SUMMARY

At least one example embodiment provides a method of operating an audio subsystem capable of improving or enhancing performance of a direct memory access (DMA) operation in which data is directly transmitted from the audio subsystem to a universal serial bus (USB) module.

At least one example embodiment of the present disclosure provides a system-on-chip (SOC) that performs the method of operating the audio subsystem.

At least one example embodiment of the present disclosure provides a method of operating the SOC.

According to example embodiments, in a method of operating an audio subsystem and a USB module, the audio subsystem receives a reference clock signal from the USB module. A USB direct memory access (UDMA) block included in the audio subsystem performs an automatic restart every predetermined period in synchronization with the reference clock signal. The UDMA block transmits data having a predetermined size to the USB module by performing a DMA operation whenever the automatic restart is performed.

According to example embodiments, an SOC includes an audio subsystem and a USB module. The audio subsystem includes an audio processor, a first memory and a UDMA block. The first memory stores audio data. The UDMA block controls a DMA operation in which the audio data is transmitted to the USB module. The USB module includes a USB controller and a second memory. The USB controller provides a reference clock signal to the audio subsystem. The second memory stores the audio data received from the audio subsystem. The UDMA block performs an automatic restart every predetermined period in synchronization with the reference clock signal received from the USB controller, and transmits data having a predetermined size to the USB module by performing the DMA operation whenever the automatic restart is performed. The data having the predetermined size is a portion of the audio data.

According to example embodiments, in a method of operating an SOC that includes an audio subsystem and a USB module, an external USB device including a USB speaker is connected with the USB module. When a play or replay of audio data is requested, the audio subsystem including a first memory receives the audio data from an external memory disposed outside the SOC to store the audio data into the first memory. The audio subsystem sets a DMA operation for the audio data stored in the first memory. A UDMA block included in the audio subsystem receives a reference clock signal from the USB module. The UDMA block counts a number of times of activations of the reference clock signal to perform an automatic restart when the number of times of the activations of the reference clock signal reaches a reference number. The UDMA block performs the DMA operation whenever the automatic restart is performed to transmit data having a predetermined size to the USB module. The data having the predetermined size is a portion of the audio data. The USB module including a second memory receives the data having the predetermined size to store the data having the predetermined size into the second memory. The USB module outputs the data having the predetermined size and accumulated in the second memory to the external USB device. The data having the predetermined size is directly transmitted from the first memory to the second memory by the UDMA block in synchronization with the reference clock signal.

In the method of operating the audio subsystem, the SOC and the method of operating the SOC according to example embodiments, the audio subsystem may include the UDMA block that is configured to perform the DMA operation with the USB module. The UDMA block may perform the DMA operation with the USB module in synchronization with the reference clock signal provided from the USB module. In other words, the UDMA block may transmit data according to a clock domain of the USB module, and thus the minimum buffering process based on hardware driving may be implemented (e.g., the size of data buffering may be minimized). As compared to using software memory copy, the buffering latency may be reduced, the DMA operation may be performed in synchronization with the reference clock signal provided from the USB module even if a clock drift occurs in the USB module, and thus the resistance to the USB clock drift may be ensured or enhanced. Accordingly, the method according to example embodiments may be applied or employed to systems where the USB call latency is important.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
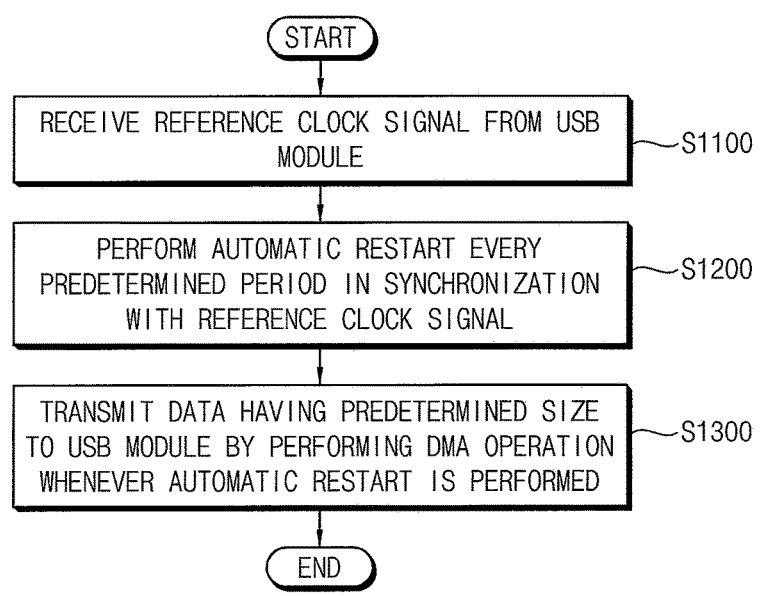
FIG. 1 is a flowchart illustrating a method of operating an audio subsystem for a USB module according to embodiments.

Various example embodiments of the inventive concept will be described more fully with reference to the accompanying drawings. All of the embodiments described herein are example embodiments. However, the inventive concept be embodied in many different forms and should not be construed as limited to the embodiments set forth herein. Like reference numerals refer to like elements throughout this application.

FIG. 1 is a flowchart illustrating a method of operating an audio subsystem for a USB module according to embodiments.

Referring to FIG. 1, a method of operating an audio subsystem for a universal serial bus (USB) module according to embodiments is performed by a system-on-chip (SOC) that includes the audio subsystem and the USB module. The audio subsystem is configured to process audio data, and the USB module is configured to output the audio data processed by the audio subsystem to an external USB device. Detailed configurations of the SOC and an electronic device including the SOC will be described with reference to FIGS. 2A, 2B and 3.

In the method of operating the audio subsystem for the USB module according to embodiments, the audio subsystem receives a reference clock signal from the USB module (S1100). The reference clock signal may be used by the audio subsystem to transmit the audio data to the USB module.

A USB direct memory access (UDMA) block included in the audio subsystem performs an automatic restart every predetermined period in synchronization with the reference clock signal (S1200). The audio subsystem may include the UDMA block that is configured to perform a direct memory access (DMA) operation with the USB module. As will be described with reference to FIG. 12, the UDMA block may be different, distinguished and/or distinct from a conventional DMA block included in a related art audio subsystem, and may be a block formed separately from the related art DMA block included in the related art audio subsystem. Operation S1200 will be described in detail with reference to FIGS. 7 and 8.

The UDMA block transmits data having a predetermined size to the USB module by performing the DMA operation whenever the automatic restart is performed (S1300). In other words, the UDMA block may transmit the data having the predetermined size to the USB module, whenever the automatic restart is performed, in synchronization with the reference clock signal provided from the USB module. The data that has the predetermined size and is transmitted to the USB module whenever the automatic restart is performed may be a portion (or part) of the audio data. Operation S1300 will be described in detail with reference to FIGS. 8, 9A and 9B.

In the method of operating the audio subsystem for the USB module according to embodiments, the audio subsystem may include the UDMA block that is configured to perform the DMA operation with the USB module. The UDMA block may perform the DMA operation with the USB module in synchronization with the reference clock signal provided from the USB module. In other words, the UDMA block may transmit data according to a clock domain of the USB module, and thus a minimum buffering process based on hardware driving may be implemented (e.g., the size of data buffering may be minimized). As compared to using software memory copy, the buffering latency may be reduced, the DMA operation may be performed in synchronization with the reference clock signal provided from the USB module even if a clock drift occurs in the USB module, and thus the resistance to the USB clock drift may be ensured or enhanced. Accordingly, the method according to the present embodiments may be applied or employed to systems where the USB call latency is important.

Figure 2A:
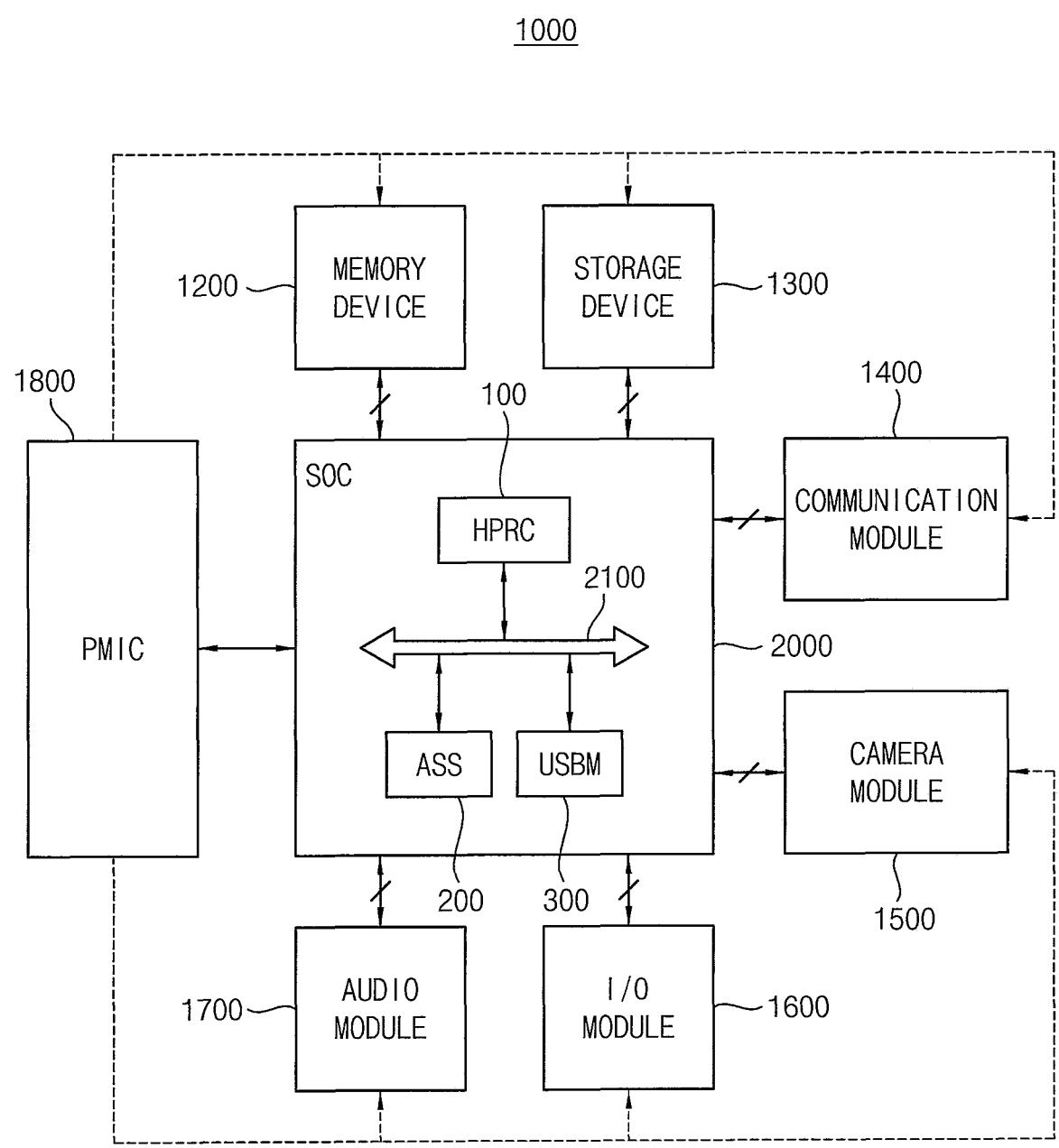
FIG. 2A is a block diagram illustrating an electronic device including a SOC according to embodiments.

FIG. 2A is a block diagram illustrating an electronic device including an SOC according to embodiments.

Referring to FIG. 2A, an electronic device 1000 includes an SOC 2000, a memory device 1200, a storage device 1300, a plurality of functional modules 1400, 1500, 1600 and 1700, and a power management integrated circuit (PMIC) 1800.

The SOC 2000 controls overall operations of the electronic device 1000. For example, the SOC 2000 may control the memory device 1200, the storage device 1300 and the plurality of functional modules 1400, 1500, 1600 and 1700. For example, the SOC 2000 may be an application processor (AP).

The SOC 2000 may include a system bus 2100, a host processor (HPRC) 100, an audio subsystem (ASS) 200 and a USB module (USBM) 300.

The host processor 100 may be electrically connected to the system bus 2100, and may control overall operations of the SOC 2000. For example, the host processor 100 may include a central processing unit (CPU) or at least one of various processors. The functional modules 1400, 1500, 1600 and 1700 may be embodied as various numbers of hardware, software and/or firmware structures that execute respective functions described below, and may be implemented by the SOC 2000 or at least one separate processor, such as another CPU, included therein to execute the respective functions.

The audio subsystem 200 may be electrically connected to the system bus 2100. The audio subsystem 200 may process audio data or audio streams that are played, replayed or recorded through an audio interface. In addition, the audio subsystem 200 may support transfer of the audio data or audio streams between the audio interface and the memory device 1200 (and/or the storage device 1300). For example, the audio subsystem 200 may be included in an audio processing system.

The USB module 300 may be electrically connected to the system bus 2100, and may also be connected to an external USB device. The USB module 300 may output the audio data or audio streams transmitted from the audio subsystem 200 to the external USB device. In addition, the USB module 300 may transmit audio data input from the external USB device to the audio subsystem 200. As will be described with reference to FIG. 3, the external USB device may include a USB speaker, a USB microphone, or the like.

Detailed configurations and examples of the audio subsystem 200 and the USB module 300 will be described with reference to FIGS. 3, 11 and 12.

The memory device 1200 and the storage device 1300 may store data for operations of the electronic device 1000. The memory device 1200 may include a volatile memory device, such as a dynamic random access memory (DRAM), a static random access memory (SRAM), a mobile DRAM, etc. The storage device 1300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some embodiments, the storage device 1300 may further include an embedded multimedia card (eMMC), a universal flash storage (UFS), a solid state drive (SSD), a hard disk drive (HDD), a CD-ROM, etc.

The functional modules 1400, 1500, 1600 and 1700 may perform various functions of the electronic device 1000. For example, the electronic device 1000 may include a communication module 1400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), a camera module 1500 that performs a camera function, an input/output (I/O) module 1600 including a display module that performs a display function and a touch panel module that performs a touch sensing function, and an audio module 1700 including a microphone (MIC) module, a speaker module, etc. that performs input/output of audio and/or video signals. In some embodiments, the electronic device 1000 may further include a global positioning system (GPS) module, a gyroscope module, etc. However, the functional modules 1400, 1500, 1600 and 1700 in the electronic device 1000 are not limited thereto.

The PMIC 1800 may provide an operating voltage to the SOC 2000, the memory device 1200, the storage device 1300 and the functional modules 1400, 1500, 1600 and 1700.

Figure 2B:
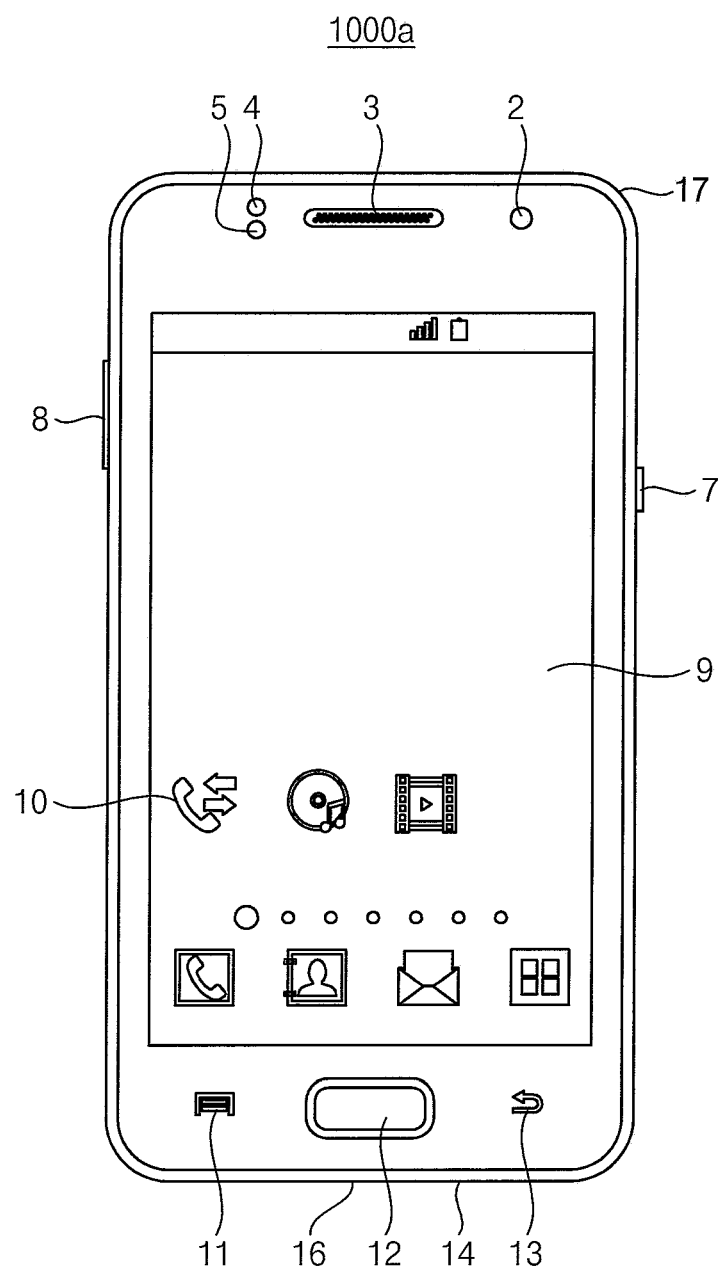
FIG. 2B is an example implementation of the electronic device of FIG. 2A.

FIG. 2B is an implementation of the electronic device of FIG. 2A.

The electronic device 1000 of FIG. 2A may be a device, such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, a drone, etc. The electronic device 1000 may typically be operated in response to a direct user input, but may also be used to communicate with other devices via the Internet or other network systems. FIG. 2B illustrates a cellular phone or a smart phone including a touch screen as an example of the electronic device 1000 of FIG. 2A.

Referring to FIG. 2B, an electronic device 1000*a* includes a front camera 2, a speaker 3, a proximity sensor 4, a luminance sensor 5, a power button 7, a volume button 8, a display and touch screen 9, icons 10, a menu button 11, a home button 12, a back button 13, a microphone 14, a USB connection part 16, and an antenna 17.

The front camera 2 may face in a direction in which the display and touch screen 9 face, and is used for a video call or video or photo shooting. The speaker 3 may output audio data when a user plays multimedia data by touching the display and touch screen 9 on one of the icons 10 or inputting a signal by speech, talks with another user over a public switched telephone network, or plays an operation sound of the electronic device 1000*a* or a notification sound. The proximity sensor 4 may control on or off of the display and touch screen 9 in order to save power and prevent miss-operation when a user holds the electronic device 1000*a* up to an ear for telephone conversation. The luminance sensor 5 may control the operations of the display and touch screen 9 and the front camera 2 according to the quantity of incident light from the surroundings of the electronic device 1000*a*.

The power button 7 may turn on or off the power of the electronic device 1000*a* or may turn on or off the display and touch screen 9. The volume button 8 may control the audio output of the speaker 3. The icons 10 corresponding to different functions may be displayed on the display and touch screen 9. For example, a user may touch an icon 10 corresponding to playback of multimedia data.

The menu button 11 may allow a user to browse a menu including icons and settings. The home button 12 may allow a home screen to appear for multi-working (or multi-tasking) mode even while the electronic device 1000*a* is performing a certain operation on the display and touch screen 9. The back button 13 may cancel an operation which is currently being performed by the electronic device 1000*a* and returns a user to a previous screen. Although FIG. 2B illustrates an example where the menu button 11, the home button 12 and the back button 13 are physical buttons, the embodiments are not limited thereto, and at least one of the menu button 11, the home button 12 and the back button 13 may be implemented in the form of a touch button displayed and operated on the display and touch screen 9.

The microphone 14 may be an input/output (I/O) interface for voice calls or voice input signals. The USB connection part 16 may be an I/O interface for communicating data between the electronic device 1000*a* and an external device and/or receiving power from the external device. The antenna 17 may be used to receive digital media broadcasting service.

A recent trend is that an audio output interface (e.g., an earphone socket such as a 3.5 Pi socket) is not included in the electronic device 1000a, and instead, a USB earphone and/or a USB headset connected to the USB connection part 16 are becoming popular. The USB connection part 16 may be connected to the USB module 300 included in the SOC 2000 according to embodiments, and may be used for the audio output (e.g., playback) of multimedia data transmitted from the audio subsystem 200 when the USB earphone or the USB headset is connected to the USB connection part 16. Although not illustrated in detail, audio output and microphone input may be interfaced through a device supporting Bluetooth.

The elements of the electronic device 1000a may be embodied in various ways realizable to those of ordinary skill in the art. Some of the elements in FIG. 2B may be omitted or replaced with other elements.

Figure 3:
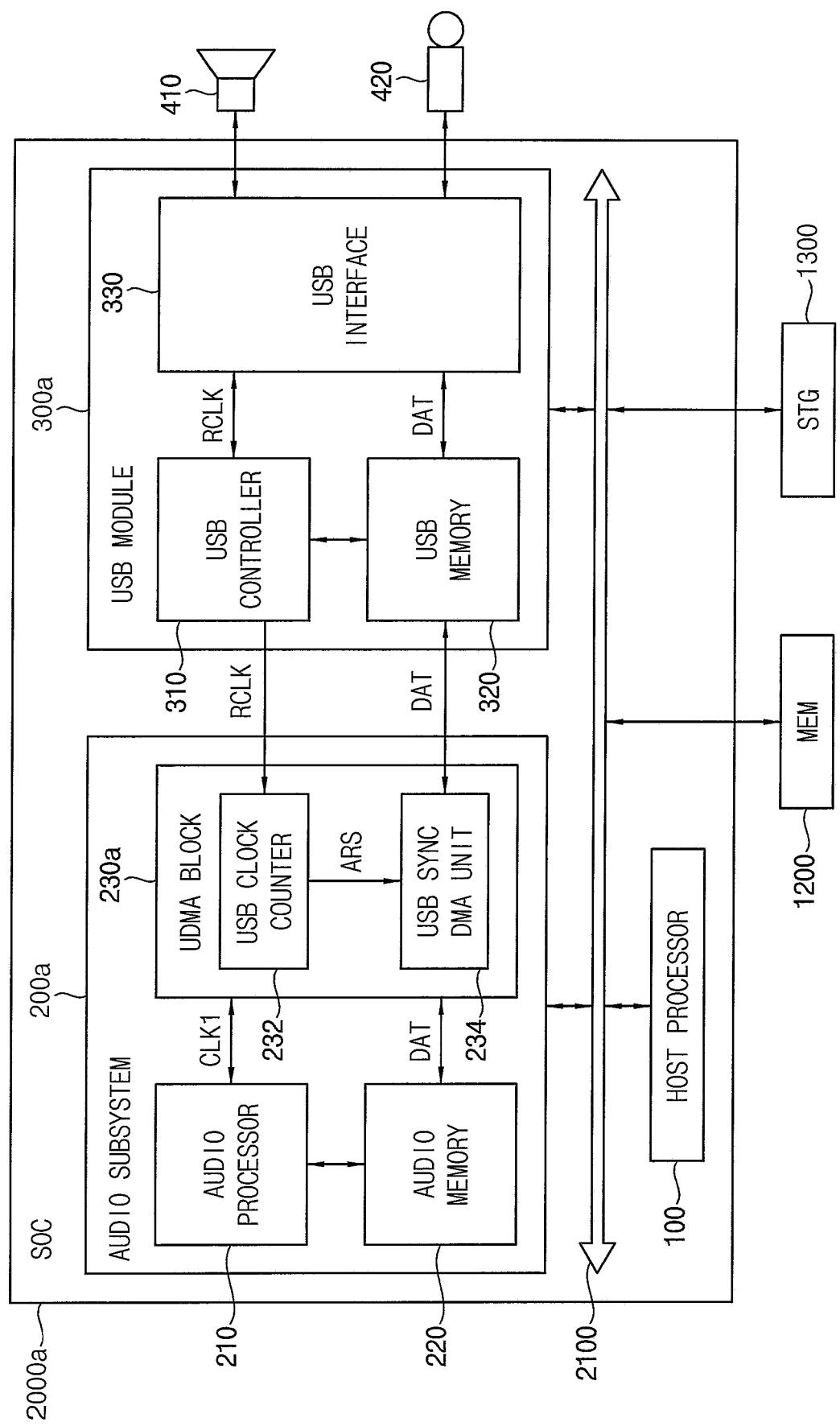
FIG. 3 is a block diagram illustrating a SOC including an audio subsystem and a USB module according to embodiments.

FIG. 3 is a block diagram illustrating a SOC including an audio subsystem and a USB module according to example embodiments.

Referring to FIG. 3, a SOC 2000a may include a system bus 2100, a host processor 100, an audio subsystem 200a and a USB module 300a.

The system bus 2100 may be referred to as an interconnect device or a backbone. The system bus 2100 may include a higher-layer bus, a lower-layer bus and a bridge connecting them. For example, the system bus 2100 may include various buses such as an advanced extensible interface (AXI), an advanced high-performance bus (AHB), an advanced peripheral bus (APB), etc. and at least one bridge connecting them. The host processor 100 may access external devices such as a memory device (MEM) 1200 and/or a storage device (STG) 1300 through the system bus 2100. In addition, the host processor 100 may communicate with the audio subsystem 200a and the USB module 300a through the system bus 2100.

The audio subsystem 200a may be electrically connected to the system bus 2100. The audio subsystem 200a may process audio data or audio streams that are played, replayed or recorded through an audio interface. In addition, the audio subsystem 200a may support the transfer of the audio data or audio streams between the audio interface and the memory device 1200 (and/or the storage device 1300).

In some embodiments, the audio subsystem 200a may exchange the audio data or audio streams with the USB module 300a. In other words, the audio interface of the audio subsystem 200a may be directly connected to the USB module 300a. Although not illustrated in FIG. 3, the audio subsystem 200a may be connected to an audio codec (coder and decoder) and/or a Bluetooth module, and may exchange the audio data or audio streams with the audio codec and/or the Bluetooth module.

The USB module 300a may be electrically connected to the system bus 2100, and may be connected to a USB speaker 410 and/or a USB microphone 420 each of which is an external USB device. The USB module 300a may output the audio data or audio signals to the USB speaker 410, or may receive the audio data or audio signals from the USB microphone 420. In some embodiments, the USB speaker 410 and the USB microphone 420 may be implemented as a single USB device such as a USB earphone or a USB headset, or may be implemented as separate USB devices. In some embodiments, the USB module 300a may be directly connected to another USB device other than the USB speaker 410 and the USB microphone 420.

The audio subsystem 200a may include an audio processor 210, a first memory 220 and a UDMA block (or a UDMA controller) 230a.

The audio processor 210 may control overall operations of the audio subsystem 200a. For example, the audio processor 210 may process first data DAT stored in the first memory 220.

The first memory 220 may store the first data DAT processed by the audio processor 210. For example, the first data DAT may be audio data, and the first data DAT may be provided from an external memory device (e.g., the memory device 1200) and/or an external storage device (e.g., the storage device 1300) and may be stored in the first memory 220 when a playback for the audio data is requested. For example, the first memory 220 may include an SRAM. The first memory 220 may be referred to as an audio memory.

The UDMA block 230a may control an access to the first memory 220. For example, the UDMA block 230a may control a data read operation from the first memory 220 and a data write operation to the first memory 220. For example, the UDMA block 230a may control a DMA operation for transmitting the first data DAT to the USB module 300a.

The UDMA block 230a may perform the method of operating the audio subsystem according to the embodiments described with reference to FIG. 1. For example, the UDMA block 230a may receive a reference clock signal RCLK from the USB module 300a, may generate an automatic restart signal ARS for performing an automatic restart every predetermined period in synchronization with the reference clock signal RCLK, and may transmit data having a predetermined size, which is a portion of the first data DAT, to the USB module 300a by performing the DMA operation whenever the automatic restart is performed.

In some embodiments, the data having the predetermined size may be directly transmitted from the first memory 220 to a second memory 320 included in the USB module 300a in synchronization with the reference clock signal RCLK, by the above-described DMA operation, e.g., by the UDMA block 230a.

The UDMA block 230a may include a USB clock counter 232 and a USB synchronization DMA unit 234.

The USB clock counter 232 may count the number of times of activations of the reference clock signal RCLK, and may generate the automatic restart signal ARS based on a result of the counting operation. For example, when the counted number of times of the activations of the reference clock signal RCLK reaches a reference number of times, the USB clock counter 232 may activate the automatic restart signal ARS. The USB synchronization DMA unit 234 may perform the automatic restart based on the automatic restart signal ARS, and may transmit the data having the predetermined size to the USB module 300a.

In some embodiments, the audio processor 210 and the UDMA block 230a may operate based on a first clock signal CLK1 different from the reference clock signal RCLK. As described above, the reference clock signal RCLK may only be used to synchronize the DMA operation (e.g., a data transfer operation) between the audio subsystem 200a and the USB module 300a. Basic and/or overall operations of components included in the audio subsystem 200a may be performed based on the first clock signal CLK1. For example, the audio processor 210 may generate the first clock signal CLK1 by itself. For another example, a separate oscillator may generate the first clock signal CLK1, and may provide the first clock signal CLK1 to the audio processor 210.

In some embodiments, the audio interface of the audio subsystem 200a may conform or follow the I2S or IIS (Inter-IC Sound or Integrated Interchip Sound) standard. In other words, the audio interface may operate based on a clock signal according to the I2S standard. For example, the first clock signal CLK1 may be the clock signal according to the I2S standard.

The USB module 300a may include a USB controller 310, a second memory 320 and a USB interface 330.

The USB controller 310 may control overall operations of the USB module 300a, and may provide the reference clock signal RCLK to the audio subsystem 200a. For example, the USB controller 310 may generate the reference clock signal RCLK by itself. For another example, a separate oscillator may generate the reference clock signal RCLK, and may provide the reference clock signal RCLK to the USB controller 310. The USB controller 310 may be referred to as a USB link.

The second memory 320 may store the first data DAT transmitted from the audio subsystem 200a. For example, as described above, the first data DAT may be sequentially transmitted from the audio subsystem 200a to the USB module 300a in portions (e.g., by the predetermined size), and thus the second memory 320 may store the first data DAT by units of the predetermined size. For example, the second memory 320 may include an SRAM. The second memory 320 may be referred to as a USB memory.

The USB interface 330 may sequentially output a portion of the first data DAT (e.g., the data having the predetermined size) stored in the second memory 320 to the external USB device (e.g., the USB speaker 410) based on the reference clock signal RCLK. The USB interface 330 may be referred to as a USB physical layer (PHY).

Figure 4:
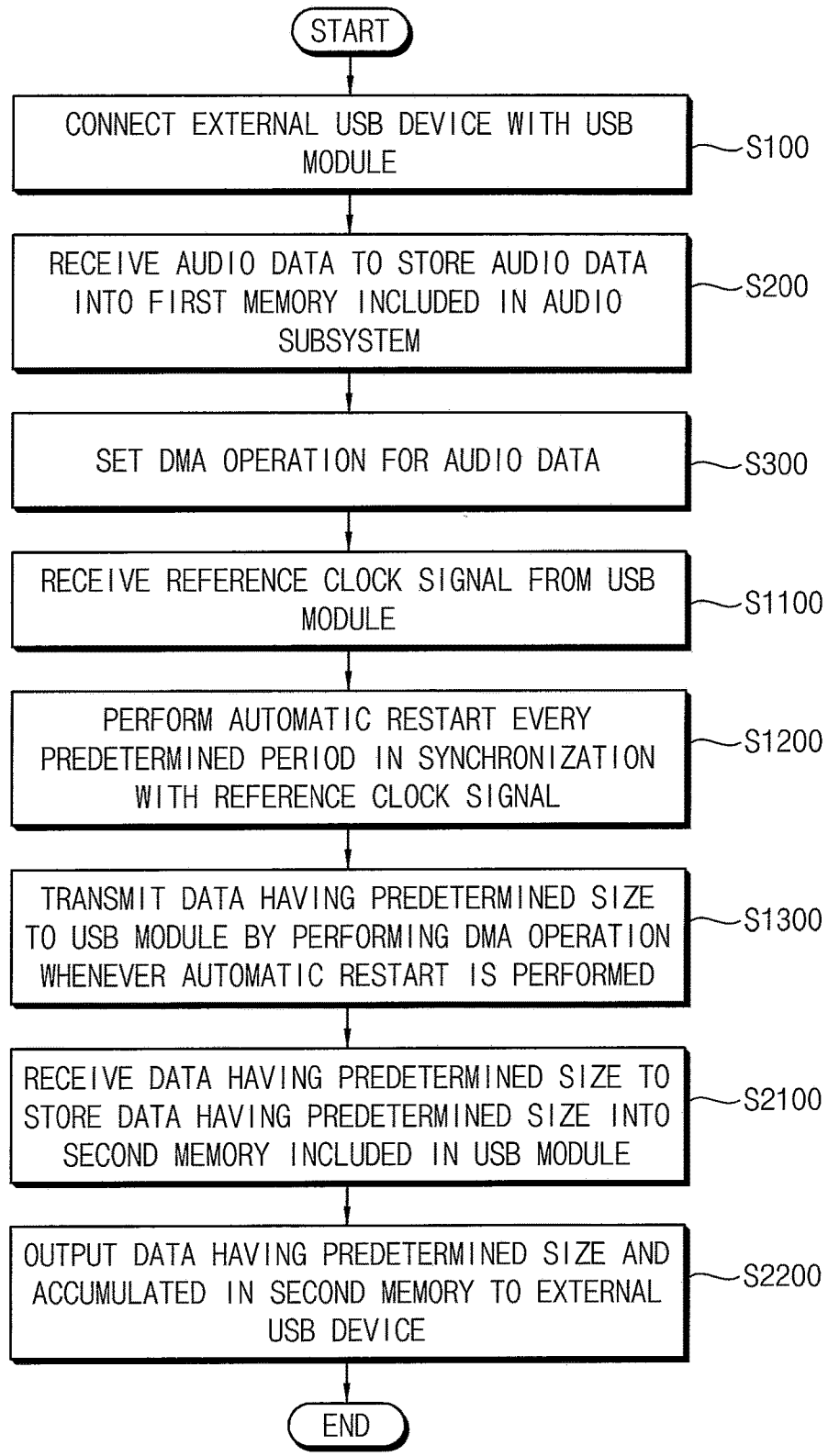
FIG. 4 is a flowchart illustrating a method of operating a SOC according to embodiments.

FIG. 4 is a flowchart illustrating a method of operating an SOC according to embodiments. The descriptions repeated with FIG. 1 will be omitted.

Referring to FIG. 4, in a method of operating an SOC including an audio subsystem and a USB module according to embodiments, an external USB device is connected with the USB module (S100). The external USB device may be a USB device for outputting audio data. As described above, by connecting the external USB device with the USB module, it may be ready to operate or drive the audio subsystem and the SOC according to embodiments (e.g., it may be ready to play or replay the audio data).

Figure 5:
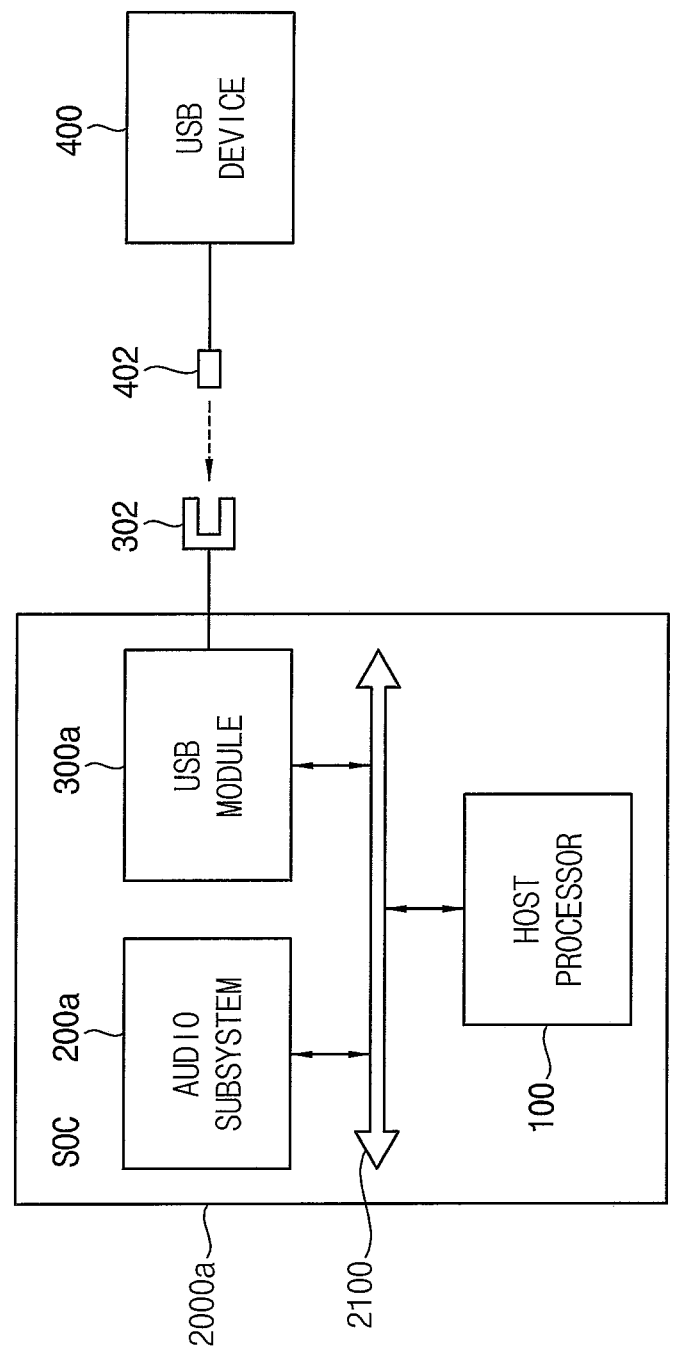
FIG. 5 is a diagram for describing an operation of connecting an external USB device with a USB module according to embodiments.

FIG. 5 is a diagram for describing an operation of connecting an external USB device with a USB module mentioned in FIG. 4.

Referring to FIG. 5, an SOC 2000a in FIG. 5 may be substantially the same as the SOC 2000a of FIG. 3. A system bus 2100 and a host processor 100 in FIG. 5 may be substantially the same as the system bus 2100 and the host processor 100 in FIG. 3, respectively. Although not illustrated in detail, an audio subsystem 200a and a USB module 300a in FIG. 5 may be substantially the same as the audio subsystem 200a and the USB module 300a in FIG. 3, respectively. An external USB device 400 in FIG. 5 may include the USB speaker 410 in FIG. 3, and may further include the USB microphone 420 in FIG. 3.

The USB module 300a may include a USB socket (or terminal) 302 for connection with the external USB device 400, and the external USB device 400 may include a USB connector 402 for connection with the USB module 300a. For example, the USB module 300a and the external USB device 400 may be electrically connected to each other by inserting the USB connector 402 into the USB socket 302. In other words, the external USB device 400 may be a device that is electrically attachable and detachable to the USB socket 302 of the USB module 300a. The USB socket 302 in FIG. 5 may correspond to the USB connection part 16 in FIG. 2B.

Referring again to FIG. 4, when a playback or replay of audio data is requested after connecting the external USB device with the USB module, the audio subsystem receives the audio data from an external memory disposed outside the SOC to store the audio data into a first memory (S200), and the audio subsystem sets a DMA operation for the audio data stored in the first memory (S300). The first memory may be a component included in the audio subsystem. As described above, by storing the audio data into the first memory and setting the DMA operation, it may be ready to transmit or transfer the audio data to the USB module (e.g., it may be ready to perform the DMA operation).

Figure 6A:
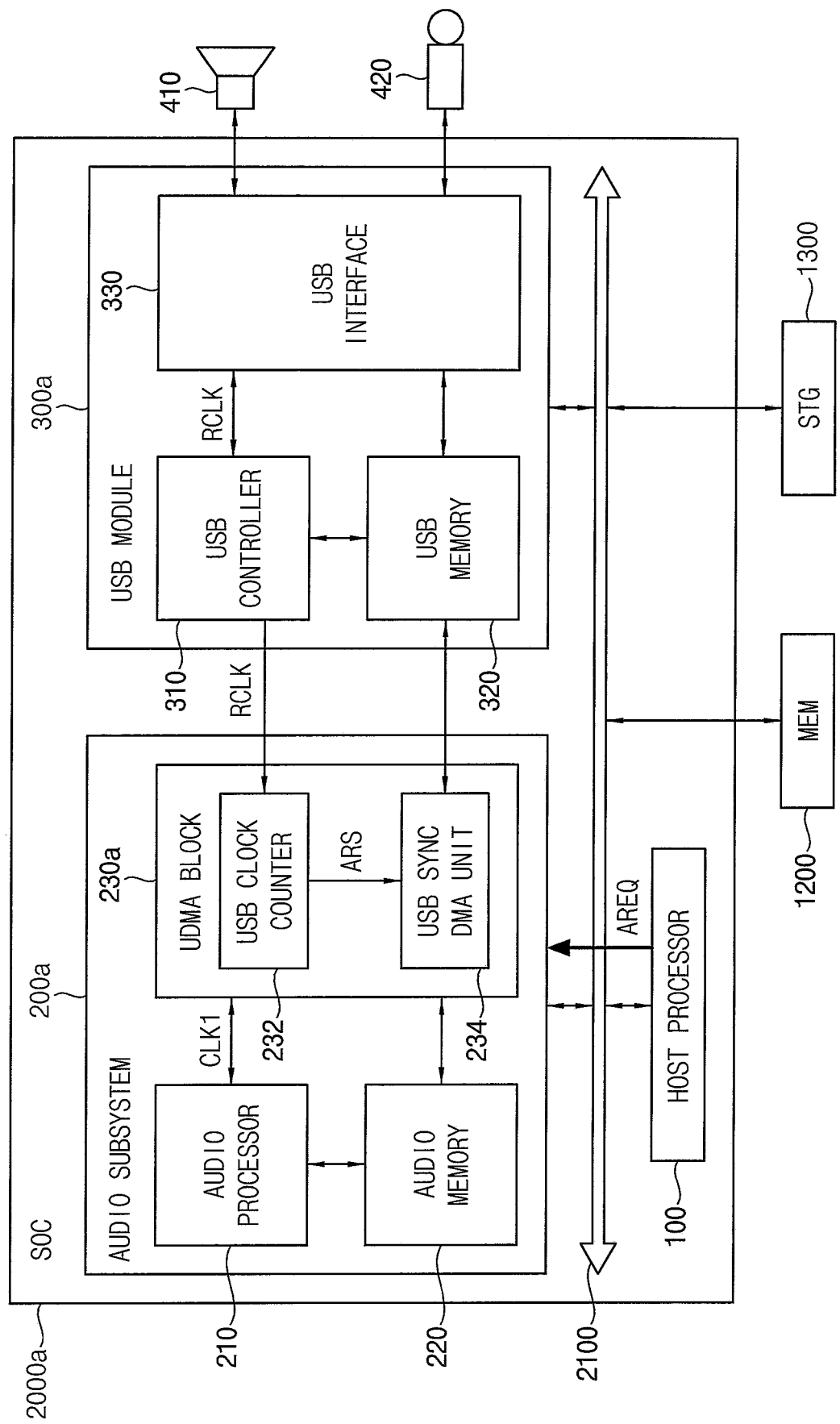
FIGS. 6A and 6B are diagrams for describing an operation of receiving audio data to store audio data into a first memory and an operation of setting a DMA operation for audio data according to embodiments.
Figure 6B:
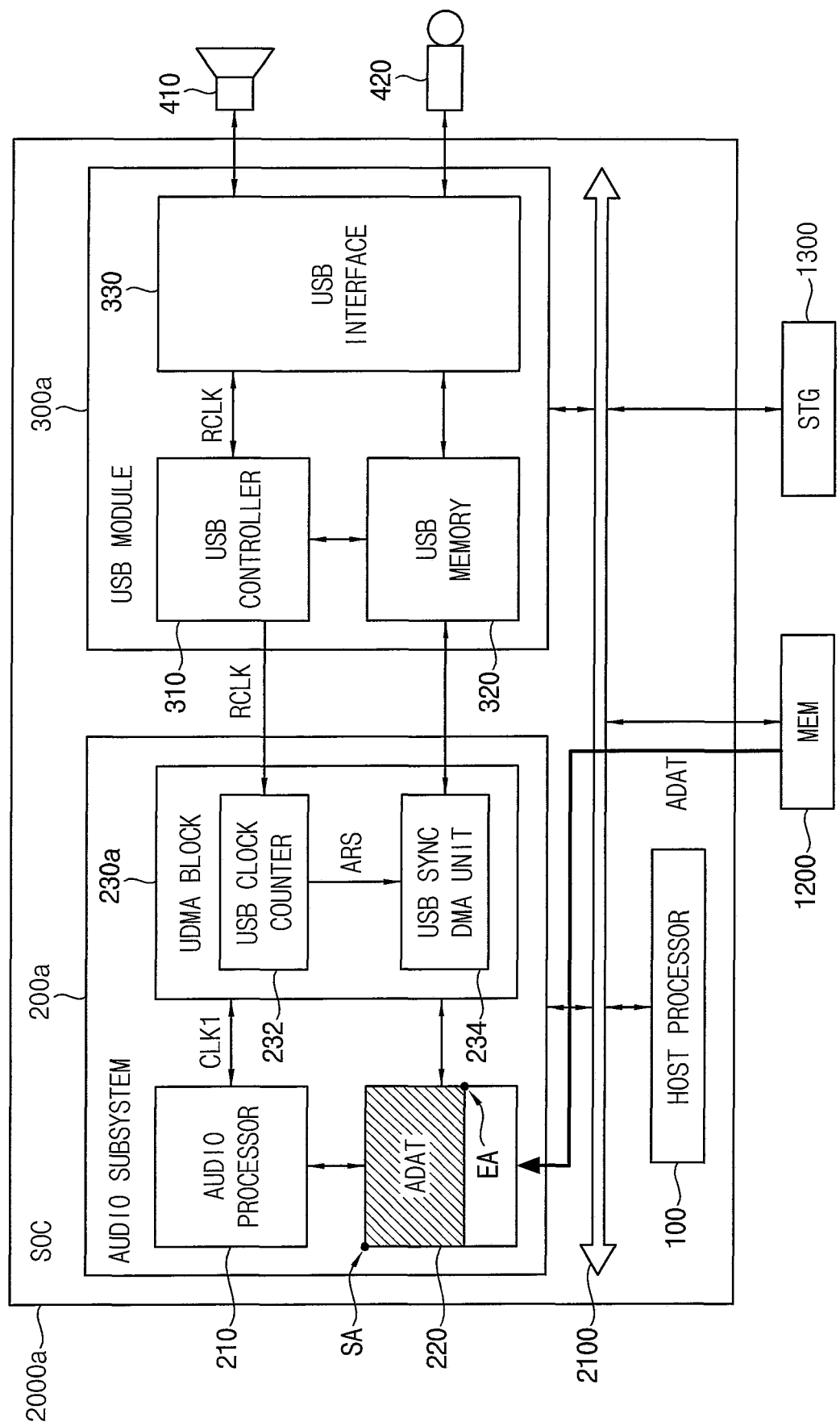

FIGS. 6A and 6B are diagrams for describing an operation of receiving audio data to store audio data into a first memory and an operation of setting a DMA operation for audio data mentioned in FIG. 4.

Referring to FIGS. 6A and 6B, an SOC 2000a, a system bus 2100, a host processor 100, an audio subsystem 200a and a USB module 300a in FIGS. 6A and 6B may be substantially the same as the SOC 2000a, the system bus 2100, the host processor 100, the audio subsystem 200a and the USB module 300a in FIG. 3, respectively.

As illustrated in FIG. 6A, the host processor 100 may generate a request signal AREQ for playing audio data ADAT, and may provide the request signal AREQ to the audio subsystem 200a. For example, when a user of an electronic device including the SOC 2000a executes a specific multimedia application for playing a specific audio source and selects the specific audio source, the host processor 100 may generate and output the request signal AREQ for playing the specific audio source.

As illustrated in FIG. 6B, the audio data ADAT corresponding to the request signal AREQ may be provided from the memory device 1200 under the control of the host processor 100, and may be stored into the first memory 220 included in the audio subsystem 200a. Although FIG. 6 illustrates that the audio data ADAT is provided from the memory device 1200, embodiments are not limited thereto, and the audio data ADAT may be provided from the storage device 1300.

When setting the DMA operation for the audio data ADAT, a start address SA and an end address EA associated with the audio data ADAT may be transmitted to the UDMA block 230a (e.g., to the USB synchronization DMA unit 234). The start address SA may indicate a start position of a storage space in the first memory 220 in which the audio data ADAT is stored, and the end address EA may indicate an end position of the storage space in the first memory 220 in which the audio data ADAT is stored. In addition, various information necessary to perform the DMA operation may be transmitted to the UDMA block 230a.

Referring again to FIG. 4, after storing the audio data into the first memory and setting the DMA operation, the audio subsystem receives a reference clock signal from the USB module (S1100), a UDMA block included in the audio subsystem performs an automatic restart every predetermined period in synchronization with the reference clock signal (S1200), and the UDMA block transmits data having a predetermined size to the USB module by performing the DMA operation whenever the automatic restart is performed (S1300). The data that has the predetermined size and is transmitted to the USB module whenever the automatic restart is performed may be a portion of the audio data.

Operations S1100, S1200 and S1300 in FIG. 4 may be substantially the same as operations S1100, S1200 and S1300 in FIG. 1, respectively.

Figure 7:
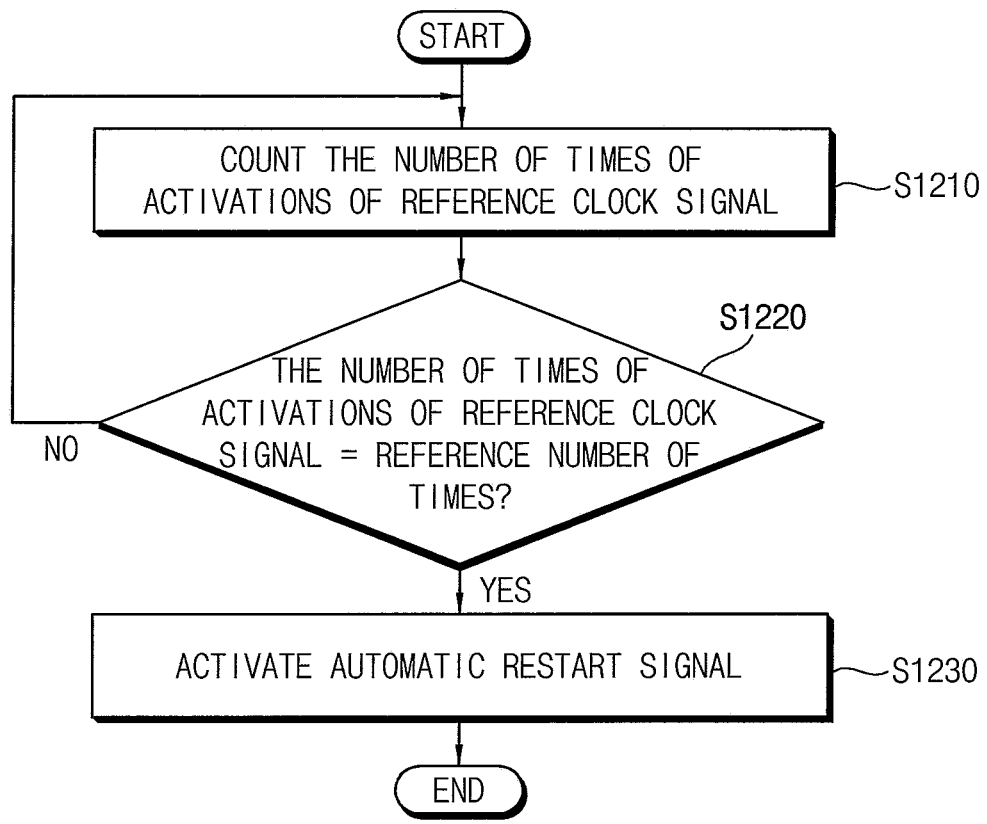
FIG. 7 is a flowchart illustrating an example of performing an automatic restart in synchronization with a reference clock signal according to embodiments.

FIG. 7 is a flowchart illustrating an example of performing an automatic restart in synchronization with a reference clock signal mentioned in FIG. 4.

Referring to FIGS. 4 and 7, when performing the automatic restart every predetermined period in synchronization with the reference clock signal (S1200), the number of times of activations of the reference clock signal may be counted (S1210). For example, the number of rising edges or falling edges of the reference clock signal may be counted, or the number of pulses included in the reference clock signal may be counted.

When the counted number of times of the activations of the reference clock signal has not reached a reference number of times (S1220: NO), operation S1210 may be repeated and the number of times of the activations of the reference clock signal may be counted until the counted number of times of the activations of the reference clock signal reaches the reference number of times.

When the counted number of times of the activations of the reference clock signal reaches the reference number of times (S1220: YES), an automatic restart signal may be activated (S1230), and the automatic restart may be performed based on the activated automatic restart signal.

In some embodiments, operations S1210, S1220 and S1230 may be performed by a USB clock counter included in the UDMA block.

Figure 8:
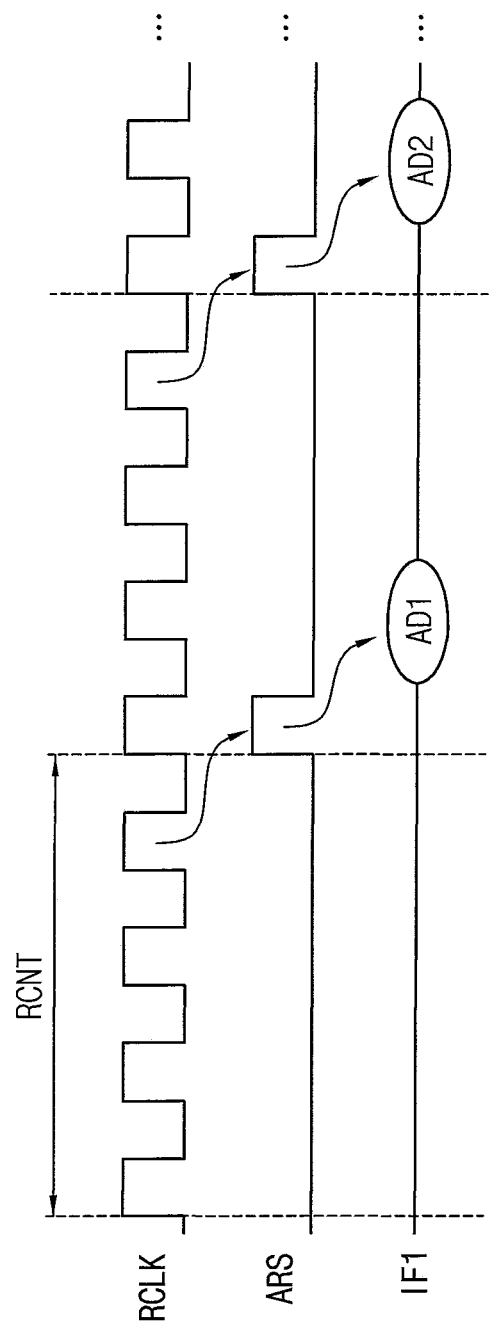
FIGS. 8, 9A and 9B are diagrams for describing an operation of performing an automatic restart in synchronization with a reference clock signal and an operation of transmitting data having a predetermined size to a USB module by performing a DMA operation according to embodiments.
Figure 9A:
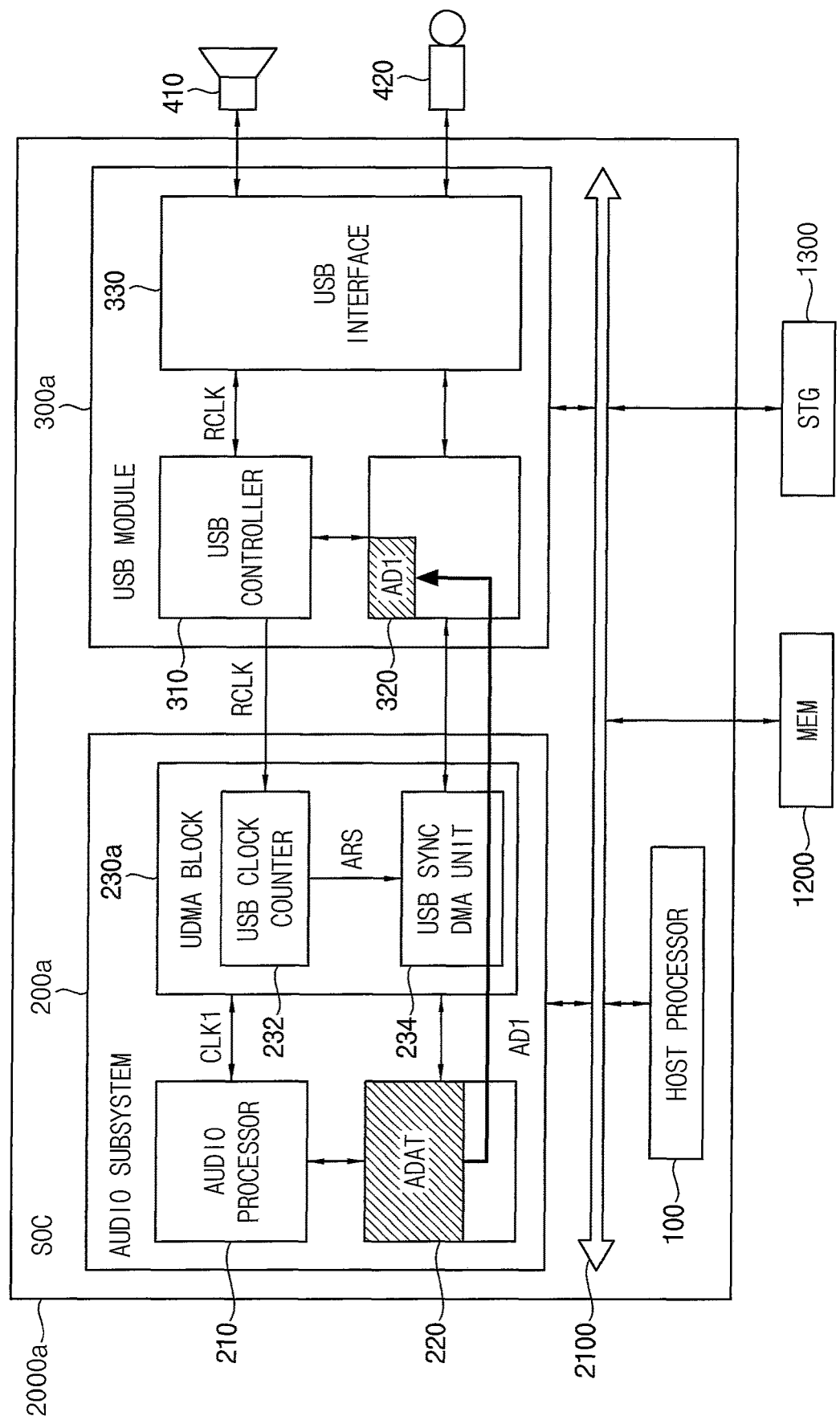
Figure 9B:
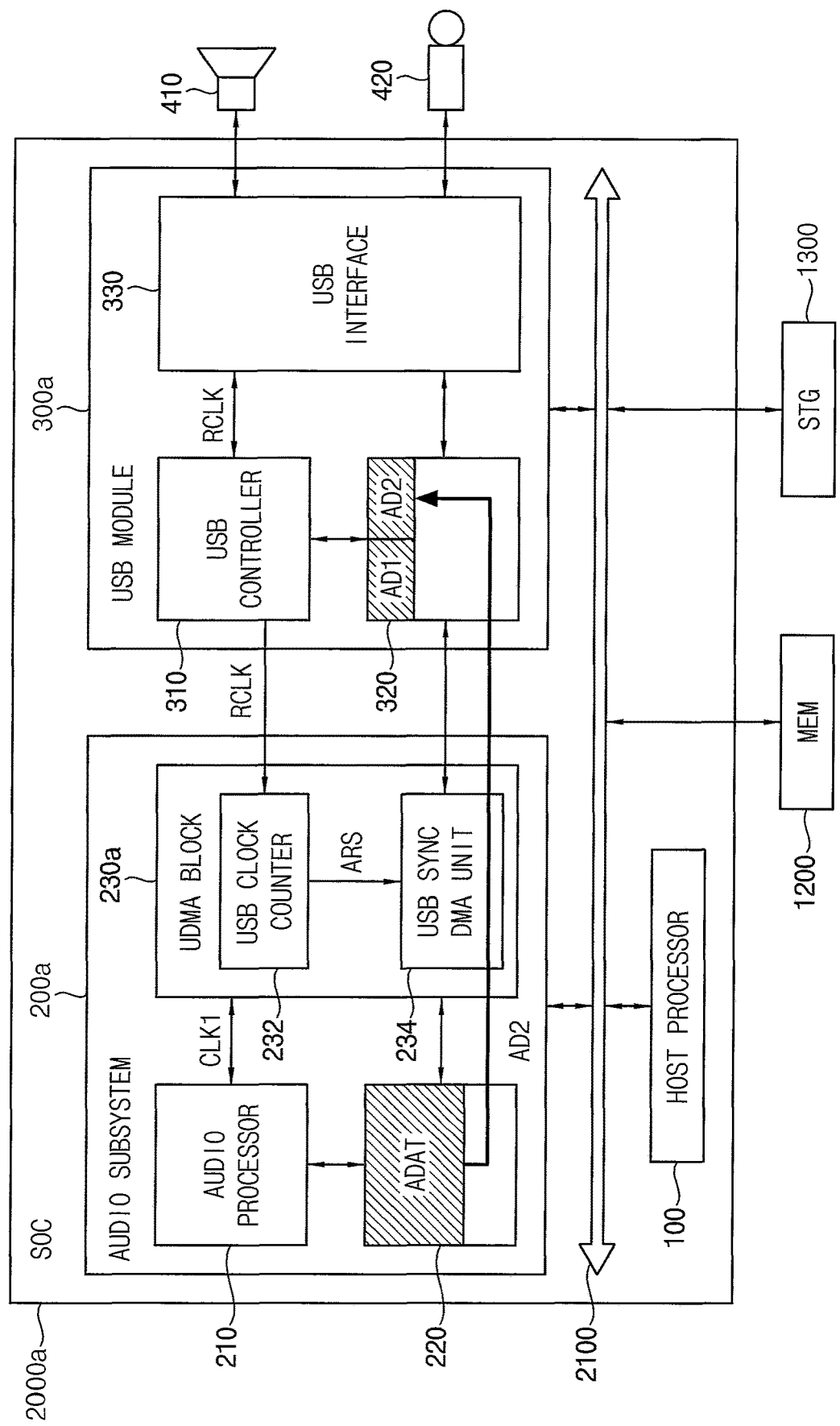

FIGS. 8, 9A and 9B are diagrams for describing an operation of performing an automatic restart in synchronization with a reference clock signal and an operation of transmitting data having a predetermined size to a USB module by performing a DMA operation mentioned in FIG. 4.

Referring to FIGS. 8, 9A and 9B, an example where a reference number of times RCNT is four times is illustrated. However, embodiments are not limited thereto, and the reference number of times RCNT may be changed according to embodiments. In FIG. 8, "IF1" represents a data transmission interface between the audio subsystem 200a and the USB module 300a. An SOC 2000a, a system bus 2100, a host processor 100, an audio subsystem 200a and a USB module 300a in FIGS. 9A and 9B may be substantially the same as the SOC 2000a, the system bus 2100, the host processor 100, the audio subsystem 200a and the USB module 300a in FIG. 3, respectively.

As illustrated in FIG. 8, when the number of times of the activations of the reference clock signal RCLK reaches four times, the USB clock counter 232 may activate the automatic restart signal ARS, and the USB synchronization DMA unit 234 may perform the automatic restart based on the activated automatic restart signal ARS. Thus, as illustrated in FIG. 9A, data AD1 having the predetermined size, which is a portion of the audio data ADAT, may be transmitted to the USB module 300a.

After that, as illustrated in FIG. 8, when the number of times of the activations of the reference clock signal RCLK reaches four times again, the USB clock counter 232 may activate the automatic restart signal ARS again, and the USB synchronization DMA unit 234 may perform the automatic restart again based on the activated automatic restart signal ARS. Thus, as illustrated in FIG. 9B, data AD2 having the predetermined size, which is another portion of the audio data ADAT, may be transmitted to the USB module 300a. The data AD1 and AD2 may be consecutive data in the audio data ADAT, and may be data having the same size. However, according to an embodiment, the consecutive data AD1 and AD2 may have predetermined different sizes.

The above-described data transmission operation may be performed continuously and/or sequentially until the entirety of the audio data ADAT are transmitted or until play or replay of the audio data ADAT is stopped.

As illustrated in FIGS. 9A and 9B, the data AD1 and AD2 may be directly transmitted from the first memory 220 included in the audio subsystem 200a to the second memory 320 included in the USB module 300a by the UDMA block 230a. In addition, as illustrated in FIG. 8, since the data transmission operation is performed in synchronization with the reference clock signal RCLK provided from the USB module 300a, the buffering latency may be reduced and the resistance to the USB clock drift may be ensured or enhanced. Further, since the data transmission operation is performed only when the automatic restart signal ARS is activated, the power consumption may be reduced.

Referring again to FIG. 4, after receiving the reference clock signal, performing the automatic restart and transmitting the data having the predetermined size to the USB module, the USB module receives the data having the predetermined size to store the data having the predetermined size into a second memory (S2100), and the USB module performs a data output operation in which the data having the predetermined size and accumulated in the second memory are output to the external USB device (S2200). The second memory may be a component included in the USB module. By performing the data output operation, the play or replay of the audio data may be completed.

Figure 10A:
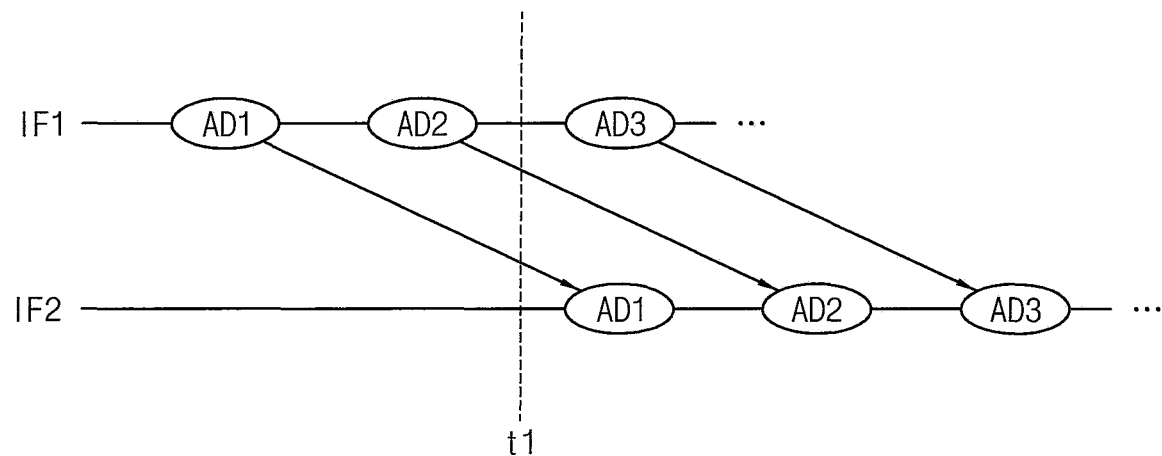
FIGS. 10A and 10B are diagrams for describing an operation of outputting data having a predetermined size to an external USB device according to embodiments.
Figure 10B:
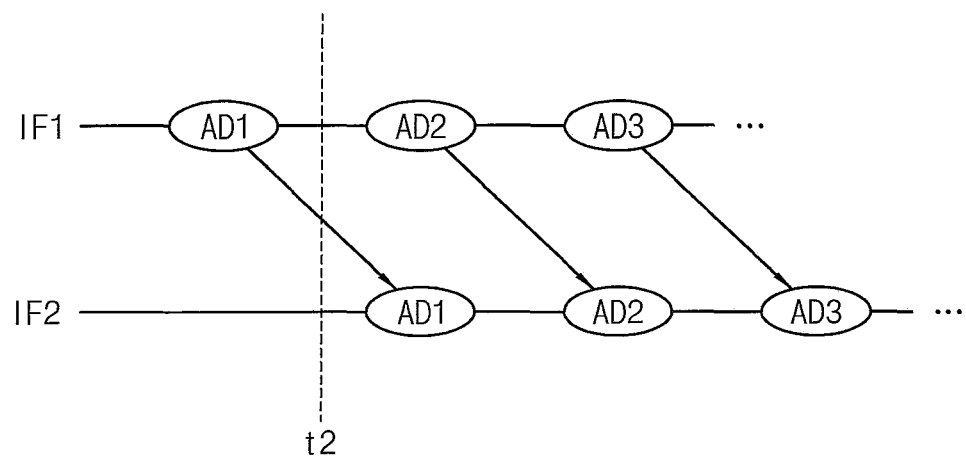

FIGS. 10A and 10B are diagrams for describing an operation of outputting data having a predetermined size to an external USB device mentioned in FIG. 4.

Referring to FIGS. 10A and 10B, examples of the data output operation are illustrated. In FIGS. 10A and 10B, "IF1" represents a data transmission interface between the audio subsystem 200a and the USB module 300a, and "IF2" represents a data transmission interface between the USB module 300a and the external USB device (e.g., the USB speaker 410).

In some embodiments, as illustrated in FIG. 10A, the data output operation may be performed after the data having the predetermined size is accumulated by two or more. For example, after two data AD1 and AD2 among data AD1, AD2 and AD3 each of which is a portion of the audio data ADAT are transmitted to the USB module 300a and accumulated in the second memory 320 (e.g., after time t1), the USB module 300a may sequentially output the data AD1, AD2 and AD3 to the USB speaker 410 through the USB interface 330. In other words, the USB module 300a may not output the data AD1 and AD2 to the USB speaker 410 while the audio subsystem 200a is transmitting the data AD1 and AD2 to the USB module 300a, the USB module 300a may output the data AD1 to the USB speaker 410 while the audio subsystem 200a is transmitting the data AD3 to the USB module 300a, and the USB module 300a may output the data AD2 to the USB speaker 410 while the audio subsystem 200a is transmitting data subsequent to the data AD3 to the USB module 300a. Although FIG. 10A illustrates that the data output operation starts after two data AD1 and AD2 are accumulated, embodiments are not limited thereto, and the data output operation may start after three or more data are accumulated.

In other embodiments, as illustrated in FIG. 10B, the data output operation may be performed after the data having the predetermined size is accumulated by one or more. For example, after one data AD1 among the data AD1, AD2 and AD3 each of which is a portion of the audio data ADAT is transmitted to the USB module 300a and accumulated in the second memory 320 (e.g., after time t2), the USB module 300a may sequentially output the data AD1, AD2 and AD3 to the USB speaker 410 through the USB interface 330. In other words, the USB module 300a may not output the data AD1 to the USB speaker 410 while the audio subsystem 200a is transmitting the data AD1 to the USB module 300a, the USB module 300a may output the data AD1 to the USB speaker 410 while the audio subsystem 200a is transmitting the data AD2 to the USB module 300a, and the USB module 300a may output the data AD2 to the USB speaker 410 while the audio subsystem 200a is transmitting the data AD3 to the USB module 300a.

In some embodiments, a data transmission interval between the audio subsystem 200a and the USB module 300a (e.g., a time interval between the data AD1 and AD2 in IF1 and a time interval between the data AD2 and AD3 in IF1) may be substantially equal to a data output interval between the USB module 300a and the USB speaker 410 (e.g., a time interval between the data AD1 and AD2 in IF2 and a time interval between the data AD2 and AD3 in IF2).

As described above, by performing operation S2200 after performing operations S1200 and S1300 only for a portion of the audio data ADAT (e.g., by performing operations S1200, S1300 and S2200 in parallel) instead of performing operation S2200 after completing operations S1200 and S1300 for the entirety of the audio data ADAT, the audio data ADAT may be efficiently played or replayed in real time with a relatively small memory capacity. However, embodiments are not limited thereto, and operation S2200 may be performed after completing operations S1200 and S1300 for the entirety of the audio data ADAT.

Although some embodiments are described based on an example where the audio data ADAT is output to the USB speaker 410, embodiments are not limited thereto, and the embodiments may be applied or employed to an example where audio data is received through the USB microphone 420.

In addition, although the method of operating the SOC according to embodiments is described based on FIG. 4, at least one of operations of S100, S200, S300, S2100 and S2200 in FIG. 4 may be included in the method of operating the audio subsystem according to embodiments described with reference to FIG. 1. For example, an operation of storing the audio data that is a target of the DMA operation in the audio subsystem, which is similar to operation S200 in FIG. 4, may be further performed before operation S1100 in FIG. 1, and an operation of setting the DMA operation for the audio data, which is similar to operation S300 in FIG. 4, may be further performed before operation S1100 in FIG. 1. For another example, an operation of performing the data output operation through the USB module based on the data having the predetermined size, which is similar to operation S2200 in FIG. 4, may be further performed after operation S1300 in FIG. 1.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 11:
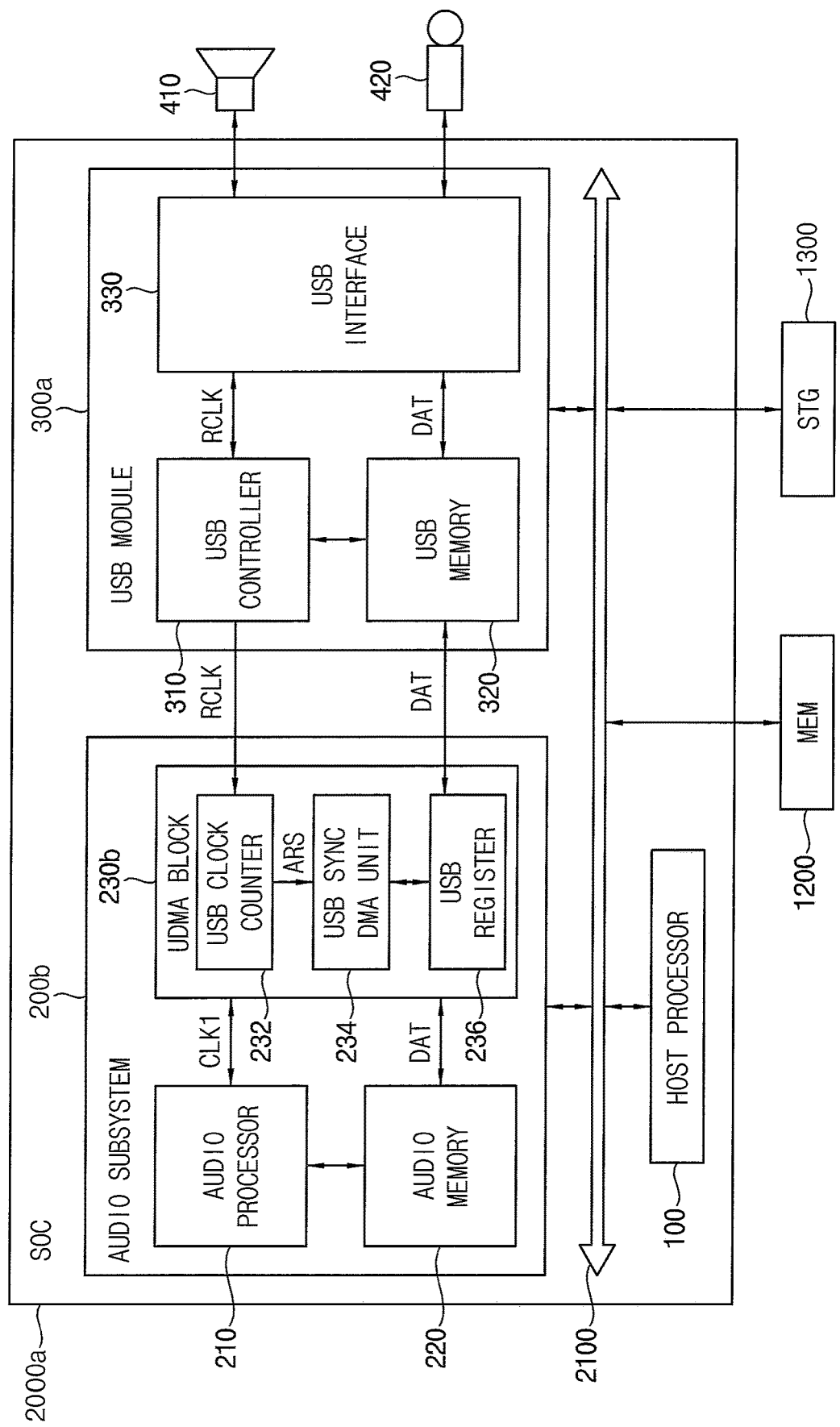
FIGS. 11 and 12 are block diagrams illustrating a SOC including an audio subsystem and a USB module according to embodiments.
Figure 12:
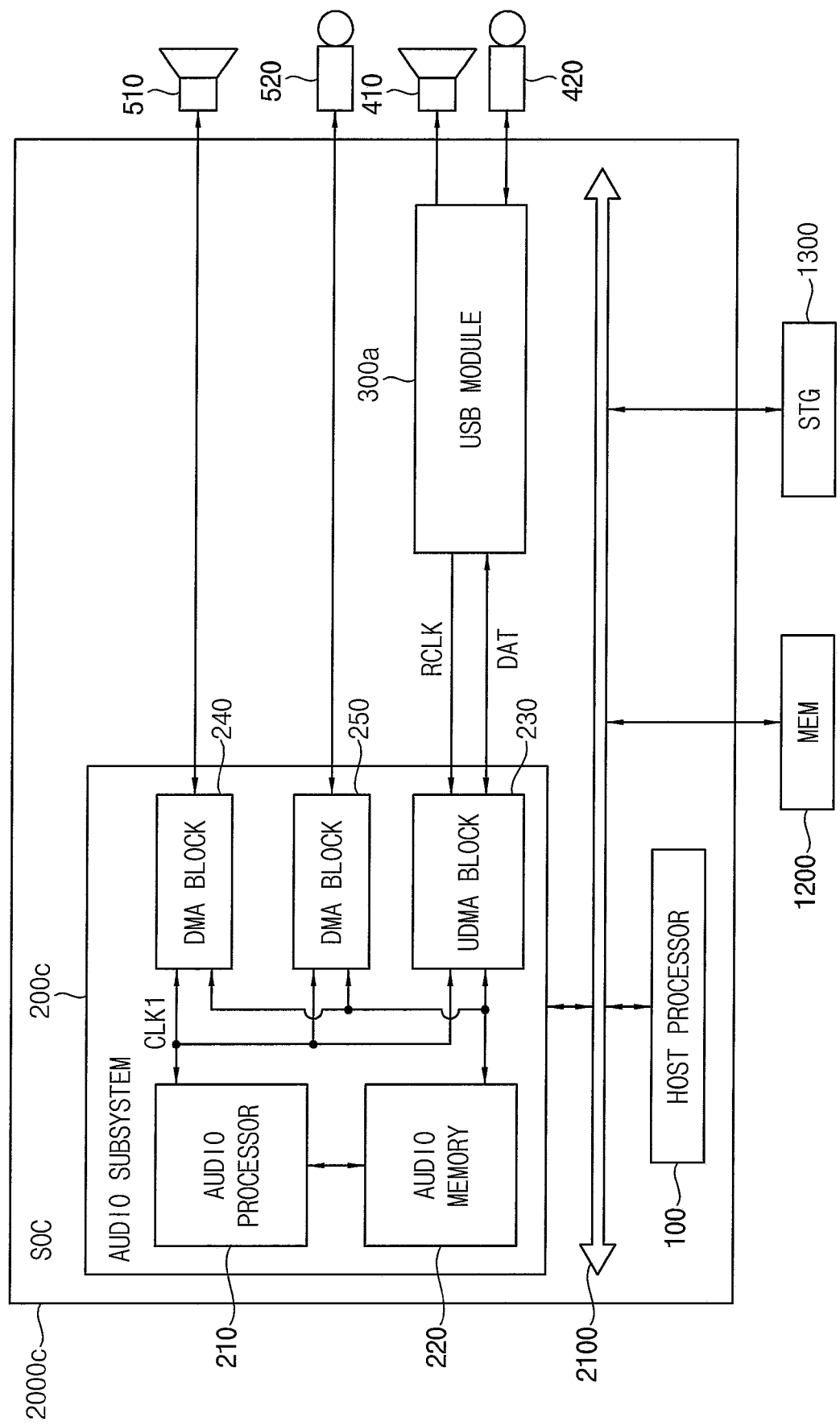

FIGS. 11 and 12 are block diagrams illustrating an SOC including an audio subsystem and a USB module according to embodiments. The descriptions repeated with FIG. 3 will be omitted.

Referring to FIG. 11, a SOC 2000b may include a system bus 2100, a host processor 100, an audio subsystem 200b and a USB module 300a.

The SOC 2000b of FIG. 11 may be substantially the same as the SOC 2000a of FIG. 3, except that elements included in the audio subsystem 200b are partially changed. The system bus 2100, the host processor 100 and the USB module 300a in FIG. 11 may be substantially the same as the system bus 2100, the host processor 100 and the USB module 300a in FIG. 3, respectively.

The audio subsystem 200b may include an audio processor 210, a first memory 220 and a UDMA block 230b. The audio processor 210 and the first memory 220 in FIG. 11 may be substantially the same as the audio processor 210 and the first memory 220 in FIG. 3, respectively.

The UDMA block 230b may include a USB clock counter 232, a USB synchronization DMA unit 234 and a USB register 236. The USB clock counter 232 and the USB synchronization DMA unit 234 in FIG. 11 may be substantially the same as the USB clock counter 232 and the USB synchronization DMA unit 234 in FIG. 3, respectively.

The USB register 236 may temporarily store data having the predetermined size that is transmitted to the USB module 300a. In other words, the data having the predetermined size may be transmitted to the USB module 300a through the USB register 236, and the USB register 236 may operate as a buffer that stores the data having the predetermined size for a while before the transmission.

Referring to FIG. 12, an SOC 2000c may include a system bus 2100, a host processor 100, an audio subsystem 200c and a USB module 300a.

The SOC 2000c of FIG. 12 may be substantially the same as the SOC 2000a of FIG. 3, except that elements included in the audio subsystem 200c are partially changed. The system bus 2100 and the host processor 100 in FIG. 12 may be substantially the same as the system bus 2100 and the host processor 100 in FIG. 3, respectively. Although not illustrated in detail, the USB module 300a in FIG. 12 may be substantially the same as the USB module 300a in FIG. 3.

The audio subsystem 200c may include an audio processor 210, a first memory 220, a UDMA block 230 and DMA blocks 240 and 250. The audio processor 210 and the first memory 220 in FIG. 12 may be substantially the same as the audio processor 210 and the first memory 220 in FIG. 3, respectively. The UDMA block 230 in FIG. 12 may be substantially the same as the UDMA block 230a in FIG. 3 or the UDMA block 230b in FIG. 11.

As with the UDMA block 230a in FIG. 3, the DMA blocks 240 and 250 may control an access to the first memory 220. For example, the DMA blocks 240 and 250 may control a data read operation from the first memory 220 and a data write operation to the first memory 220. For example, the DMA block 240 may be directly connected to a speaker 510 and may control a DMA operation for transmitting the first data DAT to the speaker 510. For example, the DMA block 250 may be directly connected to a microphone 520 and may control a DMA operation for transmitting second data DAT received from the microphone 520 to the first memory 220. For example, the speaker 510 may be a digital speaker or an analog speaker, and the microphone 520 may be a digital microphone or an analog microphone.

Although not illustrated in FIG. 12, an audio codec may be disposed between the DMA block 240 and the speaker 510 and/or between the DMA block 250 and the microphone 520. The audio codec may perform encoding and decoding (or analog-to-digital conversion (ADC) and digital-to-analog conversion (DAC)) of audio data or audio signals output to a speaker 510 and audio data or audio signals received from the microphone 520.

The speaker 510 and the microphone 520 may be an on-board speaker and an on-board microphone that are mounted on a board of an electronic device together with the SOC 2000c. For example, the speaker 510 and the microphone 520 in FIG. 12 may correspond to the speaker 3 and the microphone 14 in FIG. 2B, respectively. Thus, the speaker 510, the microphone 520 and the DMA blocks 240 and 250 connected to them may be components included in a conventional electronic device and a conventional audio subsystem.

In contrast, the UDMA block 230 may be a component that is separately formed and/or added to perform the method of operating the audio subsystem and the method of operating the SOC according to the embodiments described earlier. The UDMA block 230 may perform the DMA operation for the USB speaker 410 and the USB microphone 420 that are electrically attachable and detachable, and thus the performance of the USB speaker 410 and the USB microphone 420 may be improved or enhanced.

The inventive concept may be applied to various electronic devices and/or systems including the audio subsystems and the SOCs. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

At least one of the components, elements, modules, blocks or units (collectively "units" in this paragraph) represented by a block in the drawings and not further described above may be embodied as various numbers of hardware, software and/or firmware structures that execute respective functions described above, according to an exemplary embodiment. These units may include the audio processor 210, the USB clock counter 232, the USB synchronization DMA unit 234, the USB register 236, the DMA blocks 240, 250, the USB controller 310, the USB interface 330, etc. At least one of these units may use a direct circuit structure, such as a memory, a processor, a logic circuit, a look-up table, etc. that may execute the respective functions through controls of one or more microprocessors or other control apparatuses. Also, at least one of these units may be specifically embodied by a module, a program, or a part of code, which contains one or more executable instructions for performing specified logic functions, and executed by one or more microprocessors or other control apparatuses. Further, at least one of these units may include or may be implemented by a processor such as a CPU that performs the respective functions, a microprocessor, or the like. Two or more of these units may be combined into one single unit which performs all operations or functions of the combined two or more units. Also, at least part of functions of at least one of these units may be performed by another of these units. Functional aspects of the above exemplary embodiments may be implemented in algorithms that execute on one or more processors.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An audio subsystem connected to a universal serial bus (USB) module comprising:
    a first memory configured to store audio data; and
    a USB direct memory access (UDMA) block configured to control a direct memory access (DMA) operation in which the audio data is transmitted to the USB module; and
    wherein the audio subsystem is configured to receive a reference clock signal from the USB module, and to transmit the audio data to the USB module,
    wherein the UDMA block is configured to perform an automatic restart every predetermined period in synchronization with the reference clock signal, and to transmit data having a predetermined size to the USB module by performing the DMA operation whenever the automatic restart is performed, and
    wherein the data having the predetermined size is a portion of the audio data.

2. The audio subsystem of claim 1, wherein the UDMA block comprises:
    a USB clock counter configured to count a number of times of activations of the reference clock signal, and to generate an automatic restart signal triggering the automatic restart based on a result of the counting; and
    a USB synchronization DMA unit configured to perform the automatic restart based on the automatic restart signal, and to transmit the data having the predetermined size to the USB module.

3. The audio subsystem of claim 2, wherein the USB clock counter is configured to activate the automatic restart signal based on determining that the number of times of the activations of the reference clock signal reaches a reference number.

4. The audio subsystem of claim 2, wherein the UDMA block further comprises:
    a USB register configured to temporarily store the data having the predetermined size.

5. The audio subsystem of claim 1, wherein the data having the predetermined size is directly transmitted from the first memory to a second memory included in the USB module by the UDMA block.

6. The audio subsystem of claim 1, wherein the audio data is provided from an external memory disposed outside a system-on-chip (SOC) including the audio subsystem, and is stored into the first memory in response to a request for a play or replay of the audio data.

7. The audio subsystem of claim 1, wherein the UDMA block is configured to operate based on a clock signal different from the reference clock signal.

* * * * *